United States Patent [19]
Podmaniczky et al.

[11] 3,759,619
[45] Sept. 18, 1973

[54] MEASUREMENT OF COLOUR OF SPHERICAL OS QUASI-SPHERICAL SURFACES

[75] Inventors: András Podmaniczky; Barnabás Kiss, both of Budapest, Hungary

[73] Assignee: Merestechnikai Kozponti Kutato Laboratorium, Budapest, Hungary

[22] Filed: June 13, 1972

[21] Appl. No.: 262,172

[30] Foreign Application Priority Data
June 18, 1971 Hungary............................ ME 1382

[52] U.S. Cl.............. 356/173, 250/226, 209/111.6, 209/111.7, 356/209, 356/213, 356/243
[51] Int. Cl......................... G01j 1/06, G01j 3/48
[58] Field of Search.................... 356/173, 209, 213, 356/243; 250/226; 209/111.6; 209/111.7

[56] References Cited
UNITED STATES PATENTS
| | | | |
|---|---|---|---|
| 3,565,248 | 2/1971 | Messerschmidt | 356/209 |
| 3,709,598 | 1/1973 | Vandenberg et al. | 356/209 |
| 2,580,275 | 12/1951 | Bickley | 209/111.6 |

OTHER PUBLICATIONS
Bill Meyer, Jr., Applied Optics, Vol. 8, No. 4, Apr. 1969, pp. 737, 742-744.

Primary Examiner—David Schonberg
Assistant Examiner—R. J. Webster
Attorney—Irvin S. Thompson et al.

[57] ABSTRACT

The color of a substantially spherical surface, such as that of a fruit, is measured by rotating the object about a vertical axis and projecting on the surface of the object, downwardly at 45°, an area of light that extends from the zenith to the equator of the object and is generally spherical triangular in shape, but differs from a spherical triangle in that the arc length $s$ of the circles of latitude falling between the boundaries of the illuminated area is related as follows to the arc length $s_0$ of the 45° circle of latitude:

$$s(x) = s_0(1 + \tan x)$$

where $x$, with the appropriate sign, is the difference in angle between 45° and the central angle of the circle of latitude passing through the illuminated surface. To measure color distribution, the same apparatus is used but only an area is illuminated which is sufficiently small to be regarded as planar and the selected area is manually rotated to underlie the light spot.

5 Claims, 4 Drawing Figures

PATENTED SEP 18 1973 3,759,619

MEASUREMENT OF COLOUR OF SPHERICAL OS QUASI-SPHERICAL SURFACES

This invention concerns a process for measuring the average colour and/or the colour distribution of a hemispherical or approximately hemispherical surface, by rotating the surface about an axis passing through the zenith, illuminating the surface and sensing the reflected light; it also concerns apparatus for carrying out the process.

In the area of industrial application numerous methods are known for measuring the average-colour of the surface of fruit, or rather the colour of a smaller or greater portion of the surface of fruit, see e.g., Food Technology, 1954 p. 204–208; Transaction of the ASAE, 1968 p. 534–536; Hort. Res., 1966 p. 113–125; Agricultural Engineering, 1967 p. 448–449.

In the case of known average-colour measuring methods — which really only measures ratios of reflectance — a ring-shaped light source illuminates the whole fruit; the fruit rotates and the apparatus senses the light scattered from the entire fruit surface. In this way, however, it cannot be ensured that the measurement figures obtained take into account each element of the surface under investigation with equal weight and thus that the geometrical specifications of the CIE are met. The abbreviation CIE is the abbreviation of Commission Internationale d'Eclairage. Details about it can be found in "Color Science" by G. Wyszecki & Co., 1968, USA. At the same time, illuminating the whole of the surface as well as the sensing require complicated and expensive arrangements, the colour distribution cannot be measured and the results of measurement do not give tristimulus figures, but reflectance ratios.

The methods operating with illumination of greater or lesser surface portions are not suitable for the one-step measurement of the average colour and do not eliminate the so-called mirror-component from the readings.

The traditional measurement of reflection from hemispherical surfaces has further hidden defects. Where the whole hemisphere is illuminated by one or more light sources, possibly by being placed in a so-called Ulbricht-sphere, which is a photometric sphere specified by CIE, the different surface elements are given different weight according to the size of the angle the normal to the surface includes with the direction of the illuminating rays. Different weight is given also to the different surface elements according to the size of the angle the normal to the surface includes with the direction from which the sensor(s) sense(s) the scattered radiation. These defects are not eliminated in known methods and apparatus.

An aim of the invention is to seek to provide a simple process and apparatus for obtaining the surface integral (thus the average colour) of the measured colour characteristics in conformity with the geometrical and spectral specifications of the CIE and which are suitable for the determination of colour distribution also.

The invention is based on several recognitions. The known rotational method for obtaining the surface integral has been supplemented by examining the reflection of an illuminated part of the hemisphere which part has the shape of a spherical triangle defined by circles of longitude and the principal spherical circle bounding the hemisphere. In this way the residence time for each individual surface elements within the spherical triangle is identical, independently of the latitudinal circle a given surface element lies on. This measure, however, eliminates only a part of the errors of the measurement method, since it does not take care of the elimination of the error originating in the varying angle of illumination for individual surface elements. It is to be noted that the direction of illumination is defined herein by the radius of the sphere passing through the centre point of the spherical triangle.

It was also recognised that the above-mentioned error inherent in the use of an illuminated surface of spherical-triangular shape may be eliminated or reduced if the spherical triangle is distorted and is bounded, instead of longitudinal circles, by some other curved lines. With the aid of methods of mathematical analysis we ascertained that the aim can be achieved by using, in place of a spherical triangular light spot, a light spot having the following relationship between the arc length $s$ between the boundary circles of latitude and arc length $s_0$ of the latitudinal circle associated with the central, 45° angle:

$$s(x) = s_o (1 + tg\, x)$$

Here $x$ is the difference in angle between the 45° angle and the central angle of the latitudinal circle, and the correct sign must be substituted into the above relationship.

To measure average colour, therefore, the hemispherical surface is illuminated in the form of a narrow spherical segment and is rotated about an axis which makes 45° with the chord associated with the illuminated spherical segment. The scattered radiation is sensed by one or more light sensors disposed at an appropriate distance. Integration of the light signals, i.e., generation of the average value, takes place via the inertia of the sensors and the indicating system, perhaps with a supplementing electric capacitor. The spectral output distribution of the illuminating light and the spectral sensitivity of the sensors are co-ordinated in accordance with the CIE specifications, as a consequence of which the tristimulant colour components can be measured. Because of the dispositions of the light source and the light sensors as described below the mirror component can be eliminated from the measurement.

By changing colour filters spectral reflection can also be measured.

To measure colour distribution, the same apparatus is suitable, but by using it for illuminating areas of arbitrary shape which are sufficiently small still to be regarded as planar. The selected area is manually rotated to the light spot. Measurement takes place at the given surface locations in stationary conditions.

According therefore to the invention in one aspect there is provided a process for measuring the average colour and/or the colour distribution of a spherical or quasi-spherical surface comprising rotating the surface about an axis passing through the zenith, illuminating it and sensing the reflected light by means of light sensing means, wherein the said surface is illuminated from a direction passing through the centre of the sphere and making an angle of 45° with the axis of rotation, the light sensing means being disposed outside the plane defined by the axis of rotation and the direction of the illumination, and the illumination is limited to a surface portion bounded by a shape which deviates from a spherical triangle defined by the zenith and the principal circle of the sphere in that the arc length $s$ of the circles of latitude falling between the boundaries of the shape is related as follows to the arc length $s_o$ belonging with the 45° circle of latitude:

$$s(x) = s_o (1 + tg\, x)$$

where $x$, with the appropriate sign, is the difference in angle between 45° and the central angle of the circle of latitude passing through said portion.

When measuring colour distribution, a small quasi-planar area is illuminated which is set by manual rotation and the colour distribution is measured in a stationary condition. For investigating spherical annuli we utilize the parts of the above light spot bounded by circles of latitude.

According to another aspect of the invention, there is provided apparatus comprising means for mounting a spherical or quasi-spherical object, means rotating the object mounting means about its axis of symmetry, means for mounting a light source so as to be disposed in a direction which make substantially 45° with the axis of symmetry, and light sensing means disposed outside the plane defined by the axis of rotation and the direction of illumination, and optical means providing, in use, a light spot with which the object is to be illuminated such that the shape of the boundary of the illuminated surface differs from a spherical triangle defined by the zenith and the arc section of the principal circle of the sphere in that the arc length $s$ of the circles of latitude falling between the boundary of the shape is related as follows to the arc length $s_o$ of the circle of latitude belonging with the central 45° angle:

$$s = s_o (1 + tg\, x)$$

where $x$, with the correct sign, is the difference in angle between 45° and the central angle associated with the circle of latitude.

The above-described apparatus may be modified by having an appropriately formed light conducting means disposed outside the plane defined by the axis of rotation and the direction of illumination for transmitting the scattered light to the arbitrarily located light sensor(s).

One preferred embodiment of the colour measuring apparatus according to the invention is illustrated, merely by way of example, in the accompanying diagrammatic drawings, in which.

Figure 1:
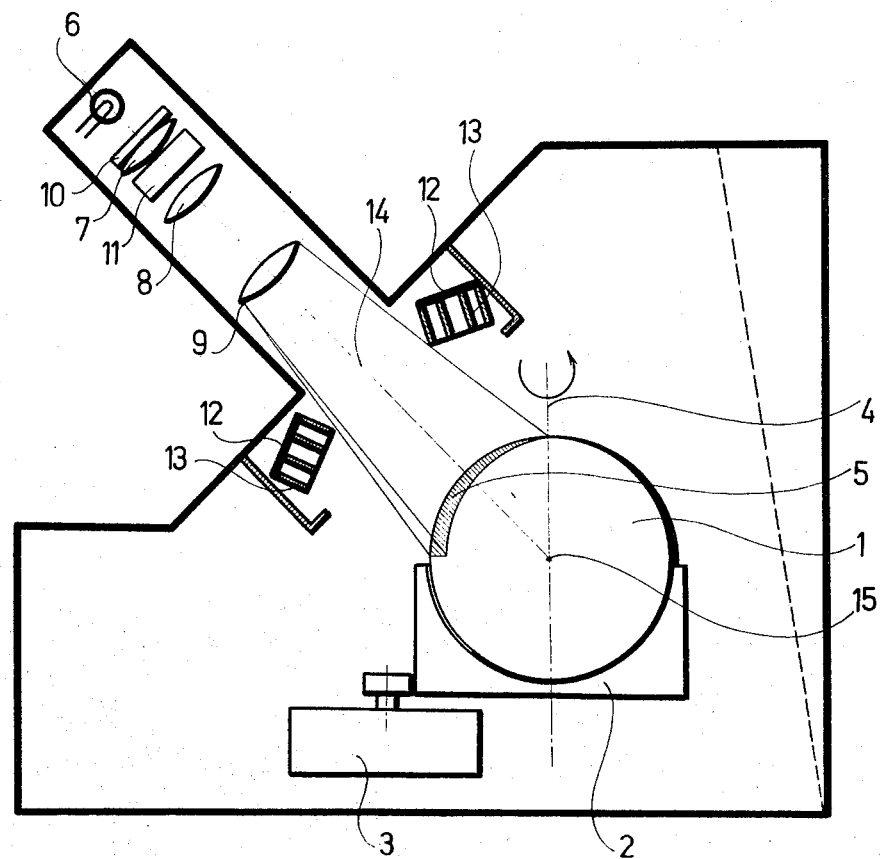
FIG. 1 shows the general arrangement of the colour measuring apparatus.
Figure 2A:
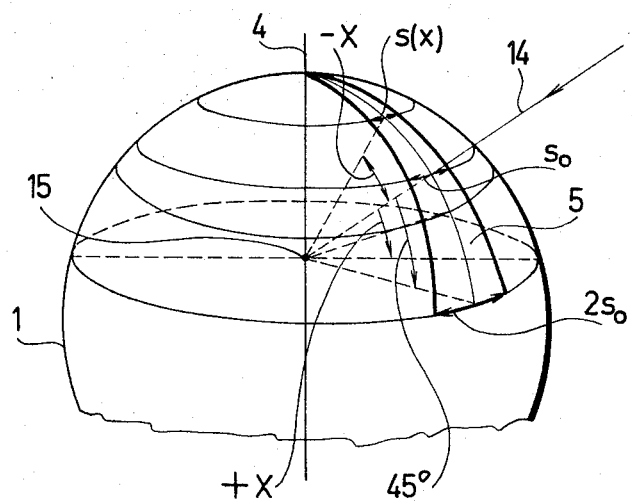
FIGS. 2 and 2a show the geometrical relationships between the source of illumination and the sensing means, with light elements shown in the plane of the drawing.
Figure 2:
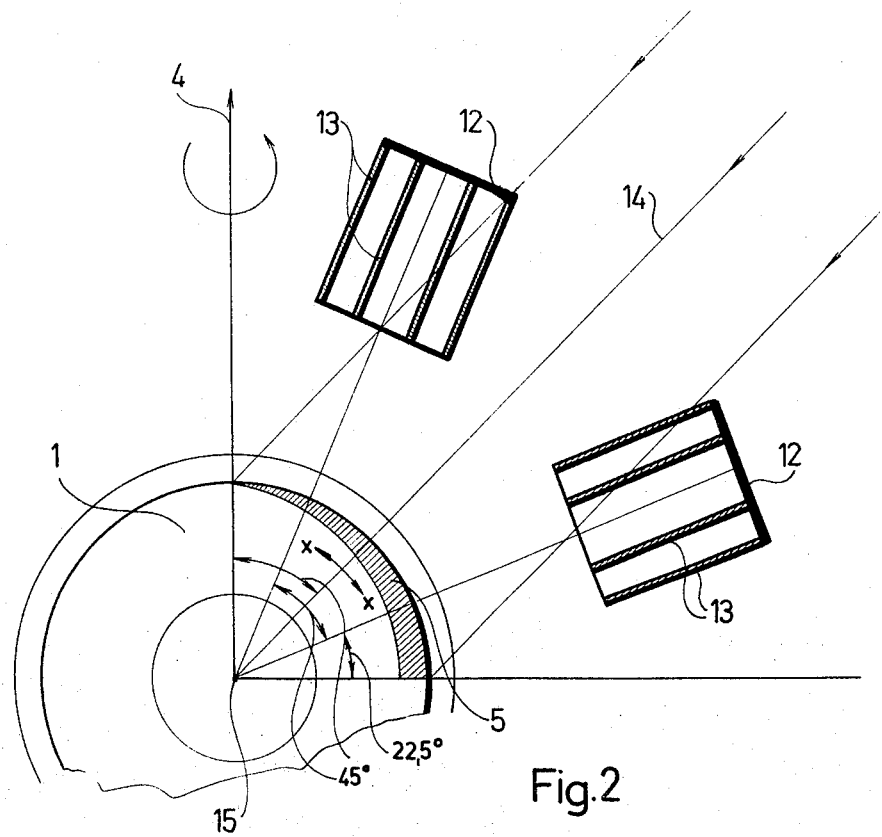

Referring to the drawings, a quasi-spherical object, e.g., fruit 1 is disposed in an appropriately dimensioned cup 2 forming part of a series of cups of varying magnitude shaped to suit the measurement series; the cup 2 is rotated about an axis 4 by a motor 3. The object 1 to be measured is illuminated by a light spot 5. The shape of the light spot and the prescribed spectral output distribution of the illuminating light are provided by an optical system comprising a light source 6, lenses 7, 8 and 9, a readily removable and replaceable light slit 10 and a similarly removable and replaceable colour filter 11. Light-sensing elements 12 detect and sense the scattered light from the object 1, and have light guiding plates 13 disposed in front of them. Lens 9 may be moved in accordance with the size of the area to be measured and with it the size of the light spot 5 may be adjusted to the desired value. The light source 6 is in use fed with stabilised D.C. (not shown). It supplies a beam of light the center light ray 14 of which impinges in the center 15 of the spherical object 1 to be measured.

Calibration of the apparatus takes place with spherical or hemi-spherical colour etalons; ascertaining their nominal values can be effected by measuring areas sufficiently small still to be regarded as planar.

Figure 3:
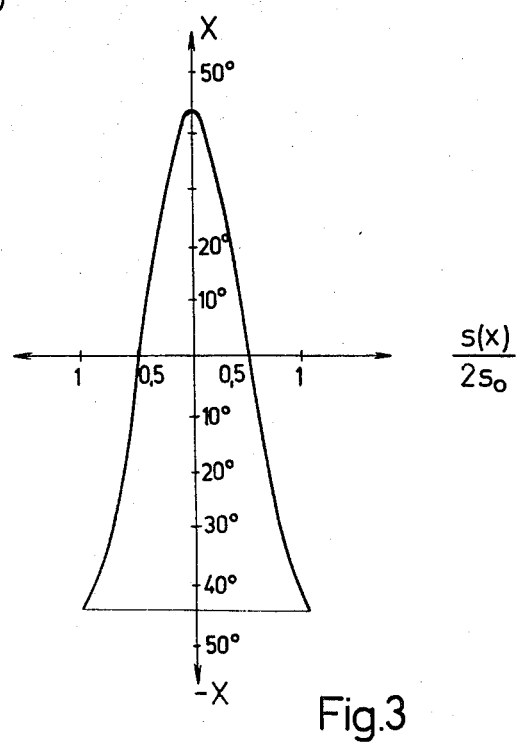
FIG. 3 shows the shape of the light spot developed in a single plane.

The elements 12 are connected in parallel. Their indication is measured by known current-compensating circuits (not shown) supplemented by connecting a capacitor in parallel with the common junction of the light elements. The shape of the light spot illuminating the quasi-spherical surface is developed into a single plane and is shown in FIG. 3 — it conforms to the above-described algebraic relationship.

Notwithstanding its simplicity, the apparatus ensures the formation of averages with equal weighting, it approaches well the 0°/45° measurement geometry of CIE and eliminates the so-called mirror components. The mirror component is the light beam reflected in the direction of the protruding portion of a polar diagram (see CIE). The apparatus is well employable for measuring the colour of larger, quasi-spherical fruits — tomato, orange, lemon, apple, peach, etc — and is thus of great importance in research into improvement of fruit quality and durability as well as for quality control.

What we claim is:

1. In a process for measuring the color of a substantially spherical surface comprising rotating the surface about an axis passing through the zenith, illuminating the surface, and sensing the reflected light by means of light-sensing means; the improvement comprising illuminating said surface from a direction passing through the center of the sphere and making an angle of 45° with the axis of rotation, the light-sensing means being disposed outside the plane defined by the axis of rotation and the direction of the illumination, and limiting the illumination to a surface portion bounded by a shape which deviates from a spherical triangle defined by the zenith and the principal circle of the sphere in that the arc length $s$ of the circles of latitude falling between the boundaries of the shape is related as follows to the arc length $s_o$ belonging with the 45° circle of latitude:

$$s(x) = s_0 (1 + \tan x)$$

where $x$, with the appropriate sign, is the difference in angle between 45° and the central angle of the circle of latitude passing through said portion.

2. A process according to claim 1 including, for measuring color distribution, limiting the illumination a surface portion small enough to be regarded as substantially planar, and rendering the surface stationary during the sensing step.

3. A process according to claim 1 wherein, for investigating spherical annuli, the light spot on said surface is bounded by said circles of latitude.

4. Apparatus for measuring the color of a spherical or quasi-spherical surface, comprising means for supporting a spherical or quasi-spherical object, means for rotating the object supporting means about an upright axis, means for mounting a light source so as to be disposed in a direction which makes substantially 45° with said axis, light-sensing means disposed outside the plane defined by the axis of rotation and the direction of illumination, and means for projecting on said surface from said light source an area of light such that the shape of the boundary of the illuminated surface differs from a spherical triangle defined by the zenith and the arc section of the principal circle of the sphere in that the arc length $s$ of the circles of latitude falling between the boundary of the shape is related as follows to the arc length $s_o$ of the circle of latitude belonging with the central 45° angle:

$$s(x) = s_o (1 + \tan x)$$

where $x$, with the correct sign, is the difference in angle between 45° and the central angle associated with the circle of latitude.

5. Apparatus according to claim 4, wherein said means for projecting comprises a light-guiding optical device between the light-sensing means and the illuminated surface.

* * * * *